US010935377B2

(12) United States Patent
Seitz

(10) Patent No.: US 10,935,377 B2
(45) Date of Patent: Mar. 2, 2021

(54) METHOD AND APPARATUS FOR DETERMINING 3D COORDINATES OF AT LEAST ONE PREDETERMINED POINT OF AN OBJECT

(71) Applicant: Rodenstock GmbH, Munich (DE)

(72) Inventor: Peter Seitz, Munich (DE)

(73) Assignee: Rodenstock GmbH, Munich (DE)

( * ) Notice: Subject to any disclaimer, the term of this patent is extended or adjusted under 35 U.S.C. 154(b) by 239 days.

(21) Appl. No.: 16/085,644

(22) PCT Filed: Mar. 14, 2017

(86) PCT No.: PCT/EP2017/000336
§ 371 (c)(1),
(2) Date: Sep. 17, 2018

(87) PCT Pub. No.: WO2017/162329
PCT Pub. Date: Sep. 28, 2017

(65) Prior Publication Data
US 2020/0292307 A1 Sep. 17, 2020

(30) Foreign Application Priority Data
Mar. 22, 2016 (DE) .......................... 102016003512.9

(51) Int. Cl.
*G01B 11/25* (2006.01)
*G01B 11/00* (2006.01)
*G02B 27/01* (2006.01)

(52) U.S. Cl.
CPC ........ *G01B 11/2545* (2013.01); *G01B 11/002* (2013.01); *G01B 11/2513* (2013.01); *G02B 27/0172* (2013.01); *G02B 2027/0178* (2013.01)

(58) Field of Classification Search
CPC .............. G01B 11/2545; G01B 11/002; G01B 11/2513; G01B 11/05; G01B 11/25; G02B 27/0172; G02B 2027/0178
(Continued)

(56) References Cited

U.S. PATENT DOCUMENTS

2009/0174880 A1* 7/2009 Momonoi .............. H04N 13/31
356/239.3
2011/0228975 A1* 9/2011 Hennessey ......... G06K 9/00624
382/103
(Continued)

FOREIGN PATENT DOCUMENTS

DE 102005003699 A1 7/2006

OTHER PUBLICATIONS

J. Geng, "Structured-Light 3D Surface Imaging: A Tutorial", Advances in Optics and Photonics, 34 pgs., 2011.
(Continued)

*Primary Examiner* — Ali Bayat
(74) *Attorney, Agent, or Firm* — Schiff Hardin LLP

(57) ABSTRACT

In a method for determining 3D coordinates of at least one predetermined point of an object, the object is arranged in a measurement region and a variable illumination source projects a variable pattern onto the object arranged in the measurement region. An image recording apparatus which is arranged in a previously known relationship with respect to the illumination source records an image of at least one section of the object illuminated by the variable illumination source. The at least one predetermined point is detected in the recorded image. The 3D coordinates of the at least one predetermined point are determined from the recorded image, taking into account the previously known relationship of the image recording apparatus with respect to the illumination source, if a check of the recorded image reveals (Continued)

Figure 1A:
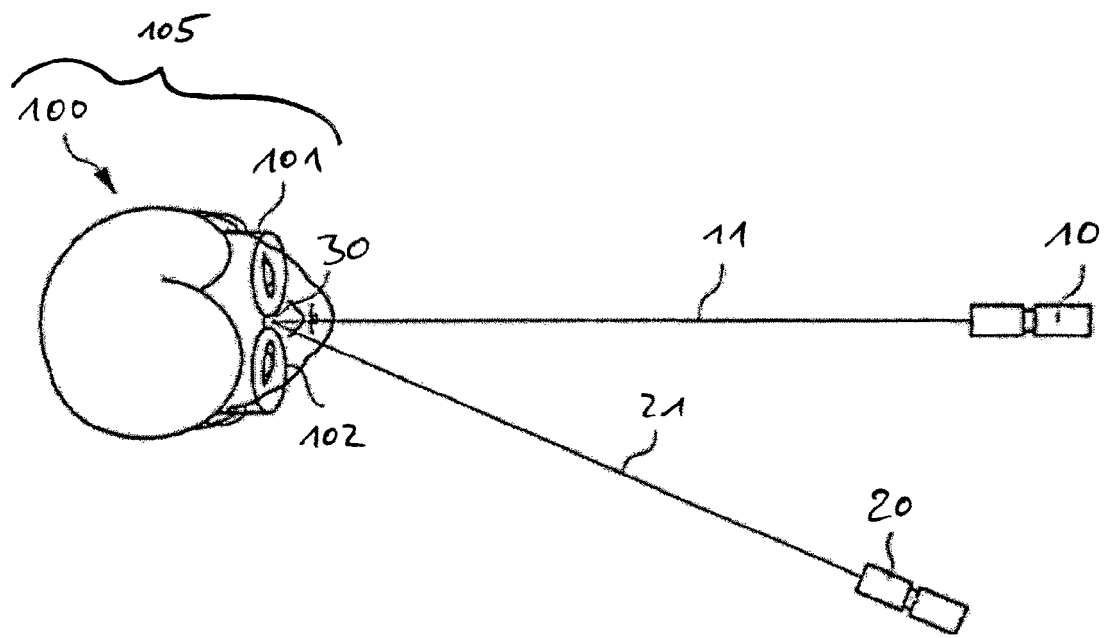

that the at least one predetermined point is marked in the recorded image by a feature of the variable pattern.

13 Claims, 5 Drawing Sheets

(58) Field of Classification Search
USPC .......................................................... 382/154
See application file for complete search history.

(56) References Cited

U.S. PATENT DOCUMENTS

| | | | | |
|---|---|---|---|---|
| 2012/0133954 | A1* | 5/2012 | Takabayashi | G06T 7/521 356/610 |
| 2012/0281087 | A1* | 11/2012 | Kruse | G01B 11/25 348/136 |
| 2013/0044128 | A1* | 2/2013 | Liu | G06T 19/006 345/633 |
| 2015/0204663 | A1 | 7/2015 | Znamenskiy et al. | |
| 2017/0269384 | A1* | 9/2017 | Tiemann | G02C 13/005 |
| 2018/0336737 | A1* | 11/2018 | Varady | G06T 7/62 |

OTHER PUBLICATIONS

European Patent Office, PCT International Search Report issued fo PCT/EP2017/000336, 3 pgs., dated Jun. 13, 2017.

* cited by examiner

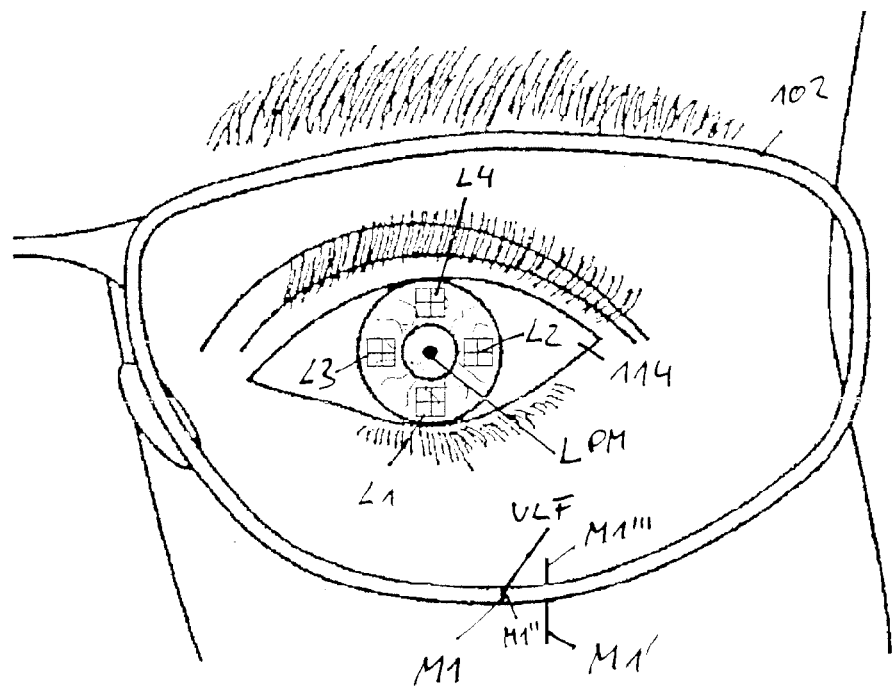
Fig. 4
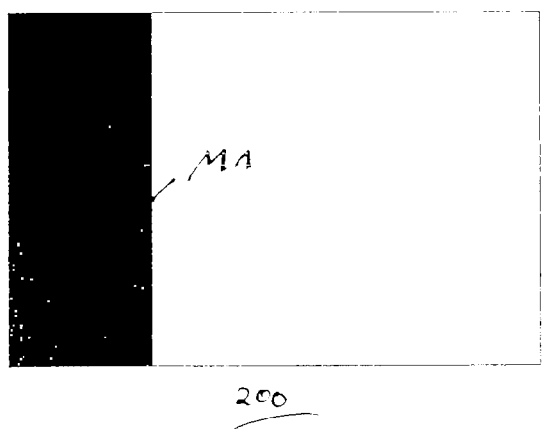
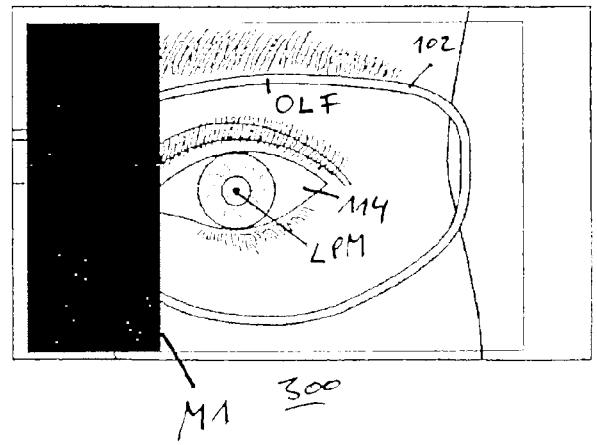
Fig. 5A
Fig. 6A

METHOD AND APPARATUS FOR DETERMINING 3D COORDINATES OF AT LEAST ONE PREDETERMINED POINT OF AN OBJECT

The present invention relates to a method and an apparatus for determining 3D coordinates of at least one predetermined point of an object, as well as a computer program product for performing the method.

Via the introduction of individually optimized spectacle lenses, it is possible to respond to the requirements of persons with defects of vision, and for example to provide spectacle lenses with individually optimized visual regions. Individually adapted spectacle lenses enable an optimal correction of optical vision defects of a user of the spectacle lenses. An individual calculation and adaptation of spectacle lenses is also possible for sports goggles, which are characterized by large deflections, face form angles, and pantoscopic angles.

In order to completely utilize the advantages of individual spectacle lenses, in particular of individually adapted progressive lenses, it is necessary to calculate and produce these spectacle lenses with knowledge of the usage position of the user, and for these lenses to be worn according to the usage position used for calculation and manufacturing. The usage position is dependent on a plurality of optical parameters, for example on the pupillary distance of the user, the face form angle, the spectacle lens inclination of the spectacles frame, the corneal vertex distance of the system of spectacles and eye, and the fitting height of the spectacle lenses. These and additional parameters which may be used or are necessary to describe the usage position are contained in relevant standards, for example DIN EN ISO 1366, DIN 58 208, DIN EN ISO 8624, DIN 5340, and may be learned from these. It is also necessary that the spectacle lenses be arranged or centered in a spectacles frame corresponding to the optical parameters which were used for the manufacturing, such that the spectacle lenses are actually worn in the usage position corresponding to the optical parameters.

To determine the position of a spectacle lens in front of the eye, a plurality of the optical parameters must be determined. On the one hand, the information required for grinding and insertion into the frame may thereby be obtained; on the other hand, optimizations in the spectacle lens itself may be performed with this in order to adapt it to the worn position in the usage position.

To determine such optical parameters, an apparatus is known—for example from DE 10 2005 003 699 A1—with two image recording devices that respectively record an image of a user with spectacles from different recording directions, from which image it calculates three-dimensional (3D) coordinates of predetermined points of the user with spectacles, for example. The optical parameters may be determined from these 3D coordinates.

Other apparatuses operate with two-dimensional calculation methods that determine the desired optical parameters using multiple images. In addition to this, there are manual determination possibilities, for example a pupillometer and a pupillary distance ruler.

In these measurement methods, a dependency exists on the person measuring and the implementation of the measurement. For example, using a two-dimensional recording the individual corneal vertex distance cannot be determined in the determination of the pupillary distance, whereby a systematic discrepancy of the pupillary distance results that is dependent on test subject and frame.

Given use of a stereoscopic camera system to determine the optical parameters of a user from 3D coordinates of predetermined points, a correspondence problem occurs. The correspondence problem relates to an identification of points corresponding to one another in two recordings captured from different perspectives. Only after points corresponding to one another have been determined in both recordings can a 3D reconstruction of the recording points take place.

In practice, the corresponding points are determined via a manual evaluation of the recordings. This manual evaluation requires a significant time cost and, due to the dependency on the user, is a potential source of error for the 3D reconstruction.

The invention is based on the object to determine an improved possibility of determining 3D coordinates of predetermined points of an object, in particular of optical parameters of a user.

This object is achieved via the subject matters of the independent claims.

A first aspect relates to a method for determining 3D coordinates of at least one predetermined point of an object, wherein:
 a) the object is arranged in a measurement region,
 b) a variable illumination source projects a variable pattern onto the object arranged in the measurement region,
 c) an image recording device that is arranged in a specified relation to the illumination source captures an image of at least one partial region of the object illuminated by the variable illumination source,
 d) a predetermined point is detected in the recorded image, and
 e) the 3D coordinates of the at least one predetermined point are determined from the recorded image under consideration of the specified relation of the image recording device to the illumination source, in the event that a check of the recorded image yields that the at least one predetermined point in the recorded image is marked by a feature of the variable pattern.

The goal of the method may be the determination of 3D coordinates of the at least one predetermined point of the object. The 3D coordinates may be determined in an arbitrary 3D coordinate system, for example in the reference system of the earth, in the reference system of the object, in the reference system of the apparatus with which the image is recorded, and/or in the reference system of the image recording device. The 3D coordinates may subsequently be processed further.

The object may in particular be the head of a person as a user, with spectacles frame placed thereon. The at least one predetermined point may hereby be a point of the system comprising the head of the user with spectacles frame that may be used for calculation of optical parameters, for example a pupil center point. The at least one predetermined point may depend on the method. The method may hereby also be designed and provided to determine the respective associated 3D coordinates for a plurality of predetermined points.

The method is described in conjunction with a determination of optical parameters from the determined 3D coordinates. It is thereby possible in principle to also use the method in other application fields, for example in the dental and/or orthopedic field, wherein model-based surfaces and/or bodies are used in which a defined number of parameters that may be determined using the 3D coordinates of predetermined points are used for description. Furthermore, the method may also be used in order to determine 3D coordinates in industrial manufacturing processes that are controlled mechanically, for example by a robot. For example, this may be used in a population of circuit boards, in which predetermined points (for example drilled holes) of the circuit boards that should be populated are located via the method. Furthermore, for example, components with defined test points may be used as objects in which the test points are, for example, cast parts or work pieces with attachment points, for example drilled holes. In general, the at least one predetermined point is a well-defined, predetermined point of the object.

Both the image recording device and the illumination source are aligned on the measurement region. The measurement region may be designed as an extended three-dimensional or two-dimensional area, or may merely be defined by a point, for example a station for a user with a spectacles frame.

The variable illumination source is designed and provided to project a variable pattern onto the object arranged in the measurement region. The auxiliary "variable" thereby means that the illumination source may project not only a single pattern but rather a plurality of different patterns, and/or that the projection direction in which the illumination source of the pattern projects is variable, and thus changeable.

The illumination source may have individual pixels that can be specifically activated. For example, a screen may thus be provided as an illumination source, for example an LCD. Depending on which pixels of the illumination source are activated, differently designed patterns may be radiated by the illumination source.

For the method, it may be sufficient if the variable illumination source possesses a number of pixels that corresponds to at least the VGA standard, thus for example at least 320×200 pixels or at least 640×480 pixels. The illumination source can be activated, and may be activated during the method, so that the pattern radiated by the illumination source is varied. The illumination source may furthermore have one or more optical elements for influencing the radiated pattern, for example deflection mirrors, prisms, lenses, polarization beam splitters, $\lambda/4$ plate, $\lambda/2$ plate etc.

A camera, for example, may be used as an image recording device, in particular a digital camera that can record a digital image of at least one sub-region of the object. The image recording device may furthermore have at least one optical deflection element, for example a deflection mirror etc. Image data of the sub-region of the object may hereby be deflected via the deflection element.

The image recording device captures an image of at least one sub-region of the object illuminated by the illumination source, wherein the image recording device may generate image data. The image data may be formed as digital data of the recorded image. The recorded image, and thus also the recorded image data, thereby contains at least one sub-region of the object that is illuminated by the pattern of the illumination source. A single image recording device that, for example, is statically firmly fixed may be sufficient to implement the method. The method thus does not use a stereoscopic camera system and/or does not require a stereoscopic image evaluation. The 3D coordinates may be determined from the image data of a single recorded image.

The image recording device is thereby arranged in the specified relation to the illumination source. This means that an optical axis of the image recording device that, for example, travels through the middle of a lens of the image recording device is arranged in a fixed relation relative to an illumination direction of the illumination source. Since both the optical axis of the image recording device and the illumination direction of the illumination source may be deflected by deflection elements, within the scope of the invention it has previously been known [sic] in particular the segment of the optical axis of the image recording device in relation to the segment of the illumination direction that ultimately meet at the object arranged in the measurement region, or intersect with this.

The specified relation may include an angle between the optical axis and the illumination direction, as well as a distance of the image recording device from the illumination source.

The specified relation may alternatively or additionally include an associated distance information, for example in the form of a table, association function, and/or list. The specified relation may thus in particular include an adjustment and/or a calibration of the image recording device relative to the illumination source. Furthermore, the specified relation may include a distance of the image recording device from the illumination source, or a distance of a deflection element of the image recording device from the deflection element of the illumination source. In addition to the distance, for example, 3D coordinates of the aforementioned locations may be specified as a component of the specified relation.

According to the method, the at least one predetermined point is detected in the image recorded by the image recording device. The detection may thereby take place manually or semi-automatically, assisted by a software. In particular, the detection may also take place entirely automatically, for example with the aid of suitable software programs. In this detection step, the at least one point is detected in the recorded image data; all of the predetermined points are preferably detected. Optionally, the detected point or points may be marked. An operator who performs the method or monitors an implementation of the method may then review the marked points, and thus the detection step.

After the detection of the at least one predetermined point, a review of the recorded image takes place. This review may be performed either automatically, thus for example entirely by a software; manually, thus by the aforementioned operator, for example an optician; or semi-automatically, for example by the operator who receives a suggestion determined by a software. In the review of the recorded image, it is reviewed whether the at least one predetermined point is marked by the feature of the variable pattern. The feature of the variable pattern may, for example, be a line, a contrasting edge, a cross, and/or another feature of the variable pattern. The feature is in particular preferably a thin light line, for example only one pixel wide, or a contrasting edge, thus a sharp transition from a region illuminated in the pattern to a region not illuminated by the pattern. Alternatively or additionally, the feature may also be a transition from a first color to a second color of the pattern, and/or a transition from a first brightness level of the pattern to a second brightness level of the pattern.

A check is performed as to whether the at least one predetermined point in the recorded image is marked by such a feature. This check is then answered in the affirmative, or positively assessed, if the feature of the pattern—thus for example the line or the contrasting edge—travels through the predetermined point. A tolerance of up to five pixels, preferably up to one pixel, may hereby be taken into account between the predetermined point and the feature in the recorded image. The marking is in particular detectable relatively precisely when an oblong feature of the pattern—for example a line or a contrasting edge—intersects with an oblong characteristic of the object, for example a segment of a spectacles frame. Such an intersection point of the feature of the pattern with an oblong characteristic of the object at an angle may be evaluated and/or estimated as a marking of the predetermined point in the review.

Using the image data, which coordinates in three-dimensional space are associated with the predetermined point marked in the image data may thus be determined, detected, and/or calculated from the specified relation of the illumination source to the image recording device. The 3D coordinates may thus be determined via triangulation, for example. Alternatively or additionally, the associated 3D coordinates may be determined from a specified correlation of the individual pixels of the illumination source in the recorded image to a distance. Given an adjustment of a permanently installed, static illumination source and a permanently installed, static image recording device, a fixed correlation of every single pixel of the illumination source to the distance from the image recording device may thus be measured and stored. Such an adjustment is explained in detail in the following.

For example, the 3D coordinates may be calculated as Cartesian coordinates, as cylindrical coordinates, and/or as spherical coordinates. An output of the 3D coordinates does not necessarily need to take place at the end of the method. The 3D coordinates may thus also be initially processed further, in particular for calculation of optical parameters of a user. These optical parameters, and not the 3D coordinates determined for their calculation, may be output as an output [sic]. In other application instances, for example, only a good/bad statement may also be output that is made on the basis of the determined 3D coordinates.

Only the coordinates of one of the predetermined points from an image and the coordinates of the remaining predetermined points from respective other, separately associated images (which are recorded successively, for example) may be determined with the method. Alternatively, all 3D coordinates of all predetermined points may be determined at the same time from a single image. For this, in the review a check is made as to whether not only the one predetermined point but rather all of the predetermined points are marked by respectively at least one feature of the variable pattern. The determination of the respective associated 3D coordinates then takes place first.

The method is not a stereoscopic method. This means that, to determine the 3D coordinates, no correspondence problem must be solved in which, as is typical in stereoscopic methods, points corresponding to one another must be found in images from different recording directions. The solving of the correspondence problem does not apply in the method according to the first aspect. Possible error sources are thereby reduced.

At the same time, it is possible to implement the method entirely automatically or at least semi-automatically, i.e. with the assistance of a processor and a software executed at the processor, for example a computer program product. Both the detection of the predetermined points in the recorded image and the checking as to whether these points are marked by a respective feature of the pattern may be performed entirely automatically or at least semi-automatically. This facilitates and simplifies the implementation of the method.

Furthermore, the method can be implemented with the assistance of a single image recording device that may be statically installed and may be provided and designed to record an image of an object arranged in the measurement region from merely a single image recording direction, along its optical axis. In the method, in particular an additional image recording device and a stereoscopic camera system may thus be omitted.

According to one embodiment, in the event that the review of the recorded image yields that the at least one predetermined point in the recorded image is not marked by a feature of the variable pattern, the variable pattern projected by the illumination source onto the object varies, and steps c) through e) are subsequently repeated under illumination with the varied pattern. If the review thus yields that either none of the predetermined points in the image data (thus the recorded image), or not all of the predetermined points, is not marked by respectively at least one feature of the variable pattern, the pattern is varied. A variation of the pattern may, for example, take place in that at least one sub-group of the pixels of the variable illumination source is activated differently than given recording of the preceding image. A varied pattern may thereby be provided. Given variation of the pattern, in particular the features of the variable pattern—for example the lines, crosses, and/or contrasting edges of the pattern—may be displaced (for example laterally in the two-dimensional image). Upon recording the following image, the variation of the pattern has the effect that the features of the pattern are arranged at different locations, for example at the predetermined points. In the variation of the pattern, it may in particular be taken into account that one or some of the predetermined points are already marked by a feature of the variable pattern. These sub-regions of the variable pattern may be kept constant, thus not varied. For example, the activation of a sub-group of the pixels of the illumination source that are responsible for formation of the sub-region with the feature that marks one of the predetermined points may hereby be left constant. To implement the method, it is sufficient to vary the pattern only in the sub-regions of the recorded image (for example via activation of a corresponding sub-group of pixels) in which is arranged one of the predetermined points that has not yet been marked by a feature of the variable pattern.

After the pattern has thus been varied, as described in step c) the image recording device records an image of the sub-region of the object illuminated by the variable illumination source. The object is thereby illuminated by the modified pattern, thus the varied pattern. In the newly recorded image, the predetermined point or points are subsequently detected, and it is reviewed again whether the predetermined point or points are marked by at least one respective feature of the varied pattern. Even in multiple images are recorded in succession in this method, only a single one of the recorded images is used to calculate the 3D coordinates of the at least one predetermined point, in particular that image in which the predetermined point is marked by the feature of the variable pattern.

According to a development of this embodiment, the variable pattern projected onto the object by the illumination source is varied, and the steps c) through e) of the method are subsequently repeated with the varied pattern, until the at least one predetermined point in the recorded image is marked by a feature of the variable pattern and the 3D coordinates of the at least one predetermined point are calculated. The method may thus be iterated and/or repeated until the 3D coordinates of the one predetermined point or of the multiple predetermined points may be determined. As long as the at least one point has not yet been sufficiently marked by a feature of the variable pattern in the most recently recorded image, the pattern projected into the measurement region is modified and the method steps c), d), and e) are repeated. Via this iterative method, it is brought about that the 3D coordinates of the at least one predetermined point are first marked in a targeted manner and may subsequently be determined with certainty.

According to one embodiment, the variable pattern is varied in a targeted manner so that the varied pattern predictively marks the at least one predetermined point of the object with a feature of the varied pattern. In other words, in the variation of the projected pattern it is taken into account where in the most recently recorded image the at least one predetermined point has been detected. However, since the 3D coordinates of the predetermined point are not yet known, and these also cannot yet be determined from the two-dimensional image without the marking, the two-dimensional coordinates of the point in the most recently recorded image may only be used to vary the pattern so that a feature of the pattern is arranged in a presumed, estimated location of the predetermined point. This estimation of the approximate location of the predetermined point may be improved via an iterative approximation, thus a repetition of the steps c) through e) of the method with variation of the pattern so that a feature of the pattern iteratively approaches the predetermined point. The variation of the pattern thus takes place under consideration of an estimation of the location of the predetermined point from the two-dimensional image recorded so far, and may additionally be improved with access to specified population data. The consideration of the estimation of an anticipated location of the at least one predetermined point reduces the number of necessary iteration steps until the calculation of the actual 3D coordinates, and thus shortens the time that is required to implement the method.

According to one embodiment, successive images are recorded with a repetition frequency of at least 10 Hz until the 3D coordinates of the at least one predetermined point are calculated. The step of the detection, the review, and the variation of the pattern hereby takes place automatically and so quickly that the next image may already be recorded with a varied pattern after a tenth of a second. The image repetition frequency is thus at least 10 Hz, preferably at least 20 Hz. The high image processing speed, variation speed, and recording speed may have the effect that, given a slight movement of the object, for example of a user with a spectacles frame, the pattern may be successfully varied so that the predetermined points of the object are marked in the recorded image. The high repetition frequency thus also enables a determination of 3D coordinates of predetermined points of an object that at least merely moves slowly.

According to one embodiment, the variable pattern has at least one essentially horizontal and/or vertical contrasting edge as a feature that is shifted and/or varied upon variation of the pattern. The contrasting edge may thereby in particular be designed as a line, in particular an line only a few pixels wide, for example a single pixel wide. The contrasting edge may also be formed as a sharp contrast transition along a line, for example between an illuminated region and an unilluminated region of the pattern. The expressions "horizontal" and "vertical" thereby relate either to the reference system of the Earth or the reference system of the object. In particular, the terms may involve a vertical and horizontal direction in the boxing system.

In the sense of this invention, what is understood by a dimensioning in the boxing system is the measurement system as it is described in relevant standards, for example in DIN EN ISO 8624 and/or DIN EN ISO 1366 DIN and/or DIN 58208 and/or DIN 5340. With regard to the boxing system and additionally used conventional terms and parameters, refer also to the book "Die Optik des Aüges und der Sehhilfen" ["The optics of the eye and vision aids"] by Dr. Roland Enders, 1995 Optische Fachveröffentlichung GmbH, Heidelberg, as well as the book "Optik und Technik der Brille" ["Optics and engineering of spectacles"] by Heinz Diepes und Ralf Blendowski, 2002 Verlag Optische Fachveröffentlichungen GmbH, Heidelberg. The standards as well as the cited book [sic] inasmuch represent an integral component of the present invention for the terminology definitions.

A displacement of the contrasting edge may hereby take place essentially perpendicular to the travel direction of the contrasting edge. Essentially horizontal contrasting edges may thus hereby be displaced in an essentially vertical direction, whereas essentially vertical contrasting edges may be displaced in an essentially horizontal direction. The actual alignment of the respective contrasting edge thereby remains preserved and/or constant.

According to one embodiment, the variable pattern has a number of geometric shapes with contrasting edges as features. The number of geometric shapes, and thus the number of contrasting edges of the pattern, is increased upon variation of the pattern. The number of geometric shapes may thereby in particular be increased in a partial region of the pattern in which the at least one predetermined point has been detected in the recorded image. Rectangles, triangles, and/or trapezoids may be used as geometric shapes. As a simple example, for example, in the most recently recorded image a geometric shape—such as a rectangle, for example—may be determined in which the predetermined point is arranged. In the successive image recording, the pattern is varied to the effect that at least that geometric shape in which the point has been detected is subdivided further. For example, a rectangle as a geometric shape may thus be subdivided into essentially identically sized geometric shapes, for example multiple smaller rectangles. For example, a rectangle may be subdivided into four smaller rectangles that are of essentially the same size. Alternatively, the rectangle might also be subdivided into more rectangles, for example 16 or more. The number of contrasting edges in a region of the pattern that predictively contains the at least one predetermined point is increased via the use of multiple smaller geometric shapes. If the 3D coordinates of multiple predetermined points should be determined in the method, all of those geometric shapes that contain one of the predetermined points may be subdivided further upon variation of the pattern. A particularly effective variation thereby takes place that may lead to a successful determination of the 3D coordinates after optimally few iteration steps.

According to one embodiment, the object is a head of a user with spectacles frame arranged thereon in the usage position. The partial region of the head of the user with spectacles frame arranged thereon in the usage position, which partial region is accommodated by the image recording device, may hereby comprise at least one pupil, both pupils, and/or the pupils encircled by the spectacles frame. The usage position is defined in the standards described above, for example. In this embodiment, the method may be used to calculate optical parameters of the user that, for example, may be taken into account in the preparation of individual spectacle lenses.

In a development of this embodiment, at least one of the following points is used as the at least one predetermined point:

a pupil center point,
an inner temporal frame point,
an inner nasal frame point,
an inner frame point above the pupil, and/or
an inner frame point below the pupil.

In the method, the 3D coordinates of all five aforementioned points are preferably determined for each of the two eyes of the user. Overall, the ten aforementioned points may thus be determined in the method. The most relevant optical parameters of the user can be determined from the 3D coordinates of these ten points. Alternatively or additionally, further frame boundary points may be determined, in particular in a boxing system.

Optical parameters of the user may hereby be determined from the determined 3D coordinates of the predetermined points. In particular, the pupillary distance, as a length between the pupil center points, may be calculated in three-dimensional space as an optical parameter. A division of the pupillary distance into a right pupillary distance and a left pupillary distance may additionally take place as an additional optical parameter. Furthermore, the optical parameter of a face form angle may be calculated for a left and/or right side of the spectacles frame. Furthermore, for example, the optical parameters of the blank length and/or blank height may be determined, which may only be approximately calculated with the cited ten points. For a more precise calculation of these parameters, the boxing system mentioned in the preceding may be used that may be taken into account in the calculation.

According to one development of the method in which a user with spectacles frame arranged in the usage position is used as an object, the 3D coordinates of a pupil center point of the user are used in that at least two points adjacent to the pupil center point are marked as predetermined points with at least one respective feature of the variable pattern, from which 3D coordinates the 3D coordinates of the pupil center point are estimated. Given the pupil center point, the problem arises that the pupil center point itself may only be marked to a limited extent by an illumination source. The pupil center point is biologically formed to direct the incident light into the inside of the eye. Therefore, at this point a distortion may arise in the image data. Instead of marking the respective pupil center point directly with a respective feature of the pattern the actual pupil center point is intentionally not selected and marked by the pattern, but rather two, three, or more points adjacent to the pupil center point are selected and marked by the pattern as predetermined points. The actual sought 3D coordinates of the pupil center point may be determined from the mean value of the respective adjacent points. For example, a point arranged horizontally to the right and left of the pupil center point may thus be marked on the iris, and its 3D coordinates may be determined. The determination of the 3D coordinates of the right and/or left pupil center point is thereby facilitated and improved.

A second aspect relates to an apparatus for determining 3D coordinates of at least one predetermined point of an object. The apparatus has a variable illumination source for projecting a variable pattern; the object arranged in a measurement region; and an image recording device that is arranged in a specified relation to the illumination source, and that is designed and provided to record an image of at least one partial region of the object illuminated by the variable illumination source. The apparatus has a detection module to detect the at least one predetermined point in the recorded image, and a coordinate determination module to determine the 3D coordinates of the at least one predetermined point from the recorded image, under consideration of the specified relation of the image recording device to the illumination source, in the event that a review of the recorded image yields that the at least one predetermined point in the recorded image is marked by a feature of the variable pattern.

The apparatus may in particular be used to implement the method according to the first aspect. Therefore, all statements indicated with regard to the method also apply to the apparatus, and vice versa. The apparatus may be designed as a static apparatus that is arranged stationary, thus for example at a predetermined location in a room. The measurement region may be a region in the same room at a distance from the apparatus. Both the illumination source and the image recording device are statically fixed at the apparatus, whereby the specified relation results. In addition to this, the relation of the measurement region to the apparatus may also be specified.

Both the detection module and the coordinate determination module may include a graphical evaluation of image data of the recorded image. Both the detection module and the coordinate determination module may be designed as a software-assisted module. The review of the recorded image at a marking of the at least one predetermined point may also be executed with software assistance, for example via a corresponding review module. The individual modules of the apparatus may, for example, be implemented at a processor, in particular at the same processor.

According to one embodiment, the apparatus additionally has a pattern variation module that varies the pattern projected by the illumination source onto the object in the event that the review of the recorded image yields that the at least one predetermined point in the recorded image is not marked by a feature of the variable pattern. As described in the preceding in conjunction with the method, the pattern variation module may implement variation possibilities, in particular a variation and/or displacement of contrasting edges of the pattern and/or a variation of the number and size of geometric shapes in the pattern, in particular in the region of the pattern in which the at least one predetermined point is arranged. The pattern variation module may vary the pattern until and with such a frequency until an image subsequently recorded by means of the image recording device may be used to determine the 3D coordinates. This means that the pattern is varied until, in the most recently recorded image, the review yields that the at least one predetermined point is marked by at least one feature of the variable pattern.

According to one development, the apparatus has a parameter determination device which is designed to determine optical parameters of a user from the determined 3D coordinates insofar as [an] object of the head of the user with a spectacles frame arranged thereon in the usage position is used.

A third aspect relates to a computer program product comprising program parts which, when loaded onto a computer, are designed to implement and/or control a method according to any of the claims 1 through 10. The computer program product may thereby be designed in particular to implement and/or control steps b) through e) of the method. The computer program product may in particular be a software product and/or an apparatus with a computer program product on which a corresponding software may be loaded.

Figure 1B:
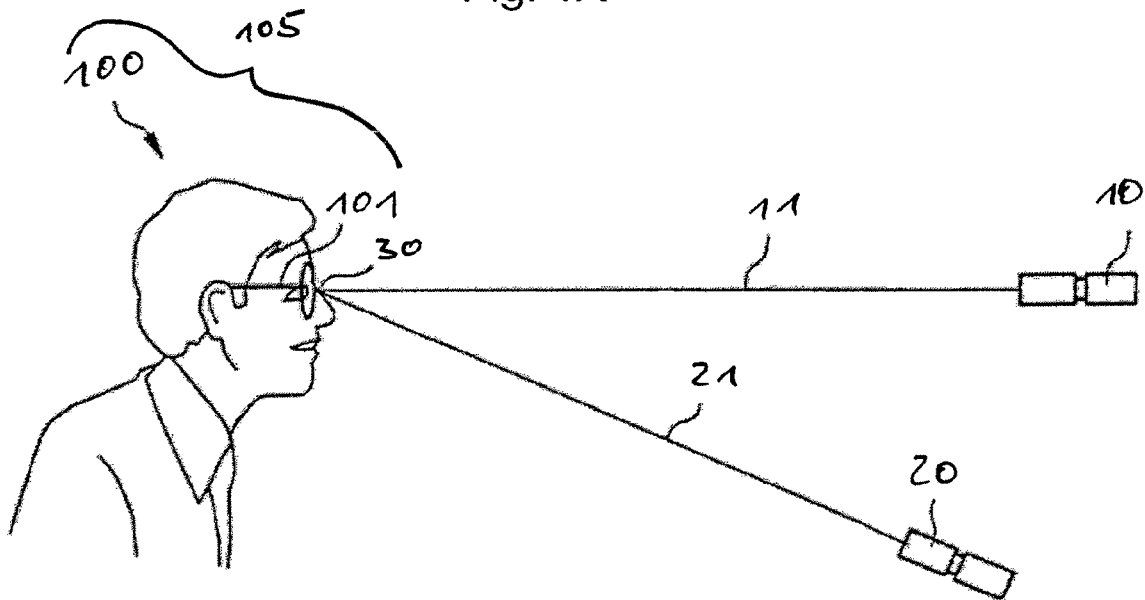
Figure 2:
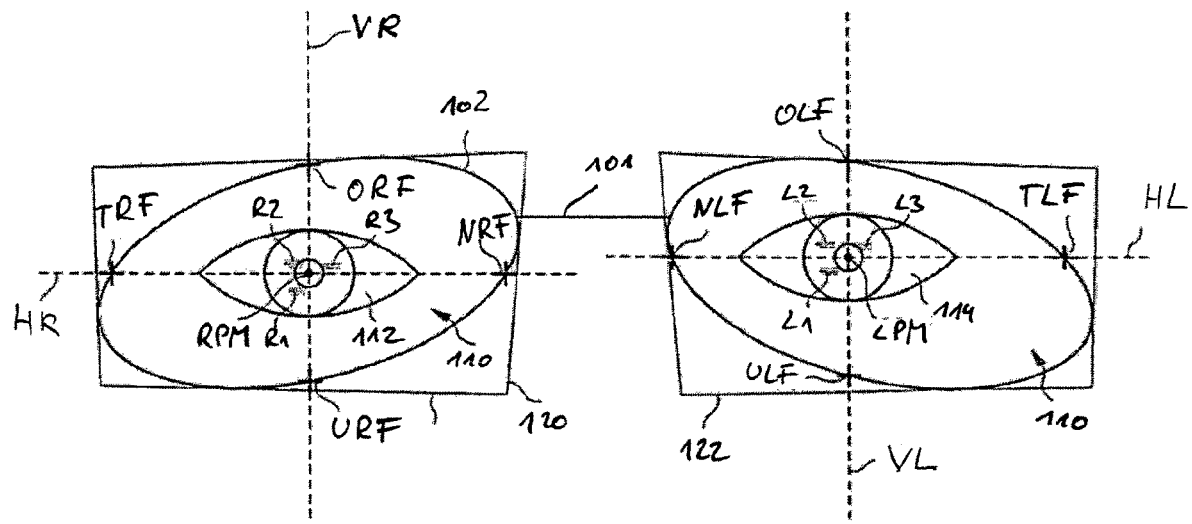
Figures 3A, 3B, 3C:
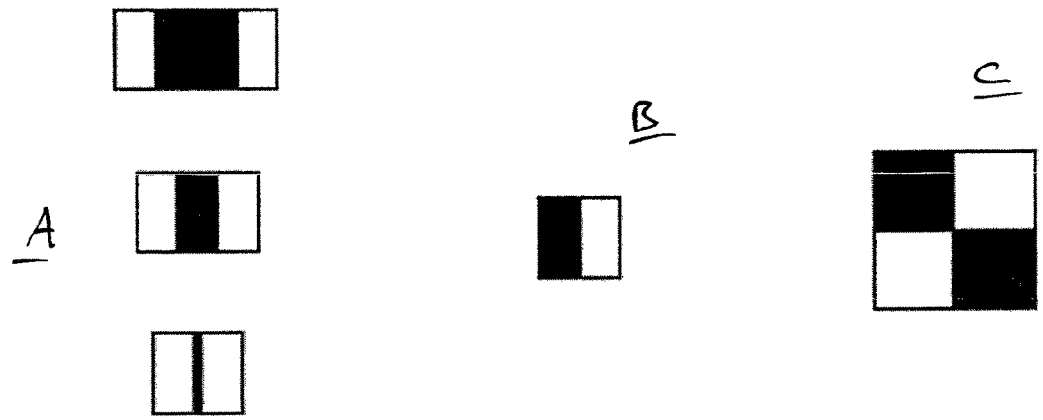
Figure 5B:
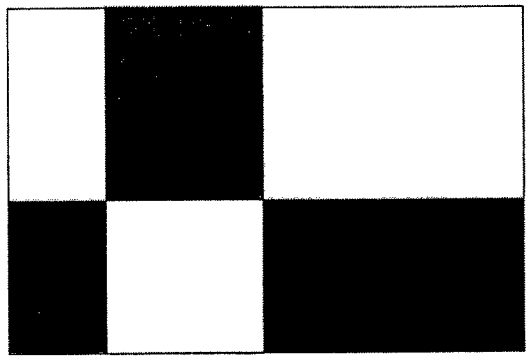
Figure 6B:
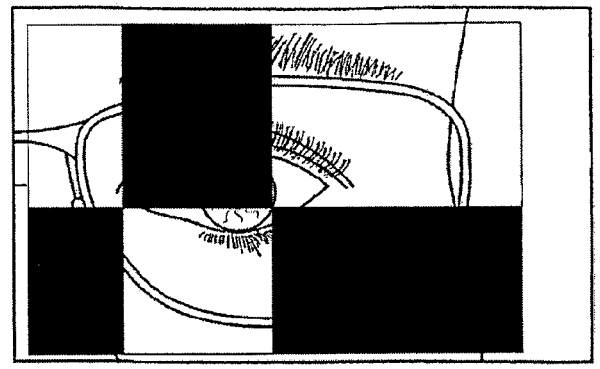
Figure 5C:
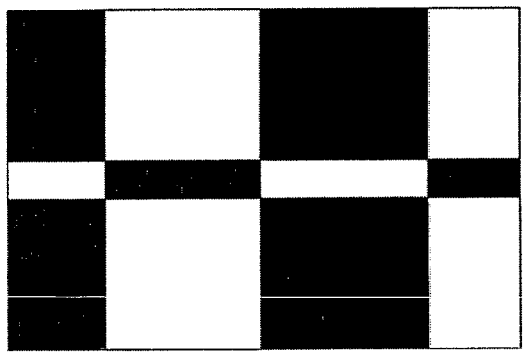
Figure 6C:
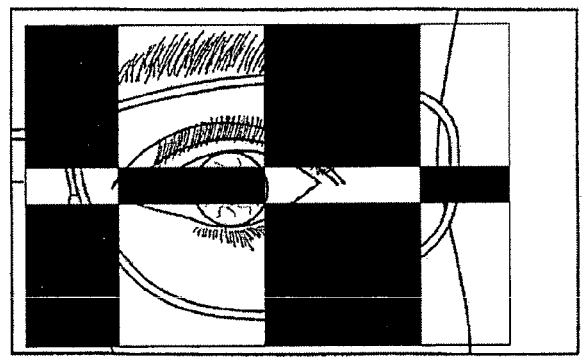
Figure 5D:
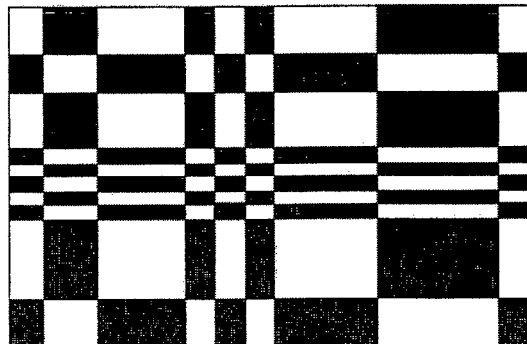
Figure 6D:
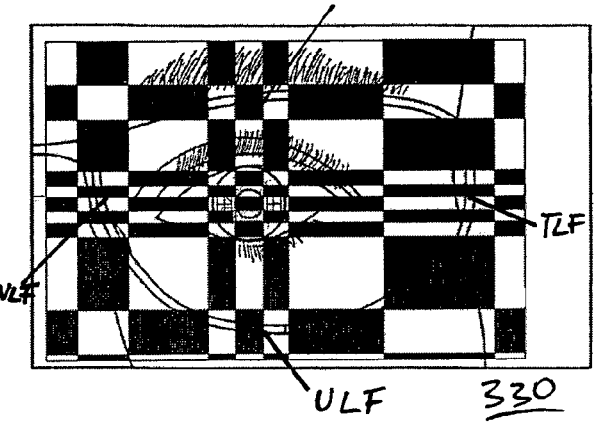
Figure 7:
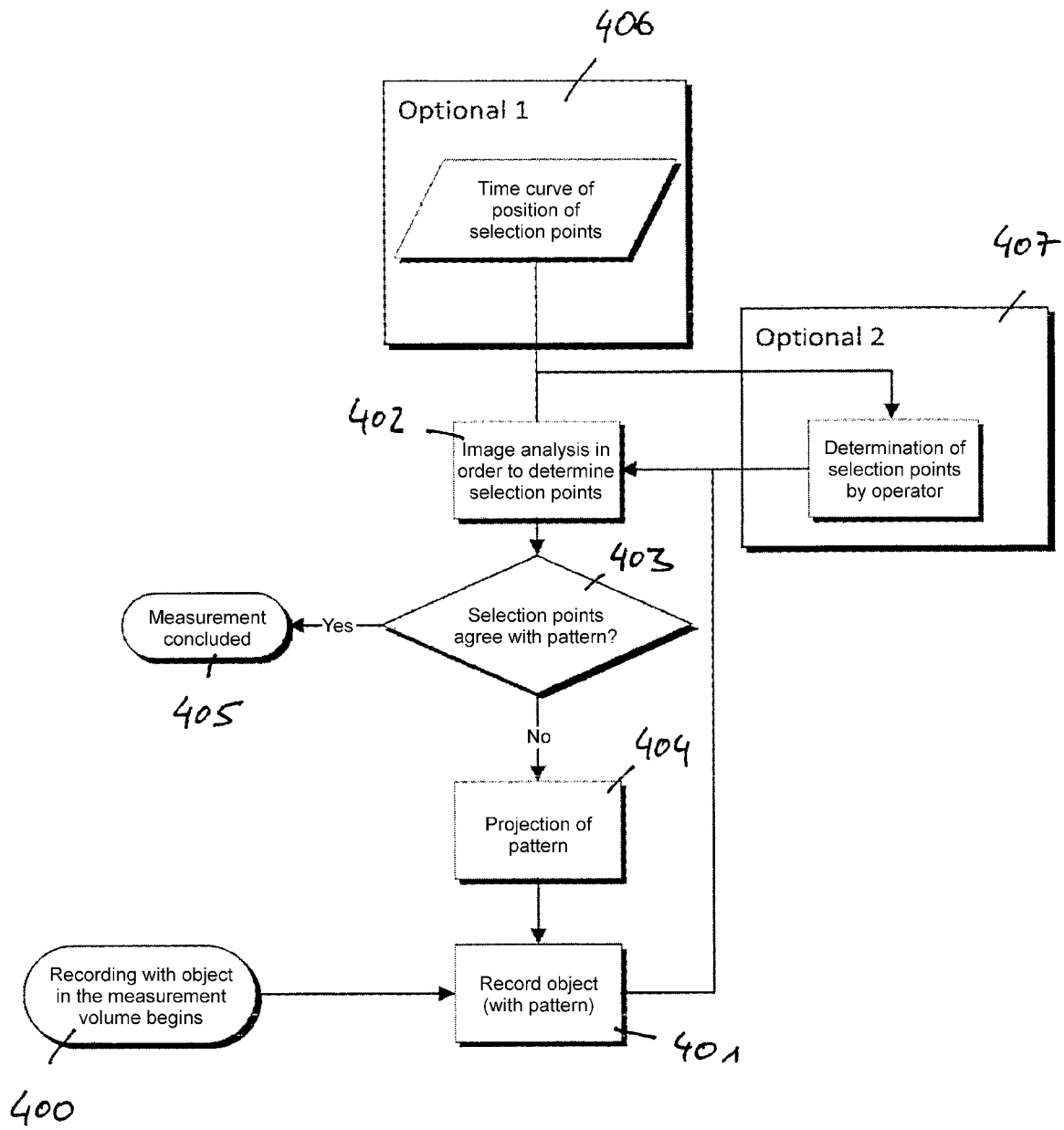

The invention is explained in detail in the following using exemplary embodiments depicted in Figures. Shown are:

FIG. 1A a schematically depicted view from above of a user, with elements of an apparatus for determining 3D coordinates of predetermined points;

FIG. 1B a schematically side view of the user, with elements of the apparatus for determining 3D coordinates of predetermined points;

FIG. 2 in a schematic depiction, image data of an image of a user with spectacles frame, said image data being recorded by an image recording device;

FIGS. 3A, 3B, and 3C in a schematic depiction, patterns that are projected by an illumination source;

FIG. 4 in a schematic depiction, a partial region of an image of a user with spectacles frame, said image being recorded by an image recording device;

FIG. 5A in a schematic depiction, a first pattern that is projected by an illumination source;

FIG. 5B in a schematic depiction, a second pattern that is generated from a variation of the first pattern depicted in FIG. 5A;

FIG. 5C in a schematic depiction, a third pattern that is generated from a variation of the second pattern depicted in FIG. 5B;

FIG. 5D in a schematic depiction, a fourth pattern that is generated from a variation of the third pattern depicted in FIG. 5C;

FIG. 6A in a schematic depiction, a first image of an eye of a user that is encircled by a spectacles frame, onto which eye the first pattern shown in FIG. 5A is projected;

FIG. 6B in a schematic depiction, a second image of an eye of a user that is encircled by a spectacles frame, onto which eye the second pattern shown in FIG. 5B is projected;

FIG. 6C in a schematic depiction, a third image of an eye of a user that is encircled by a spectacles frame, onto which eye the third pattern shown in FIG. 5C is projected;

FIG. 6D in a schematic depiction, a fourth image of an eye of a user that is encircled by a spectacles frame, onto which eye the fourth pattern shown in FIG. 5D is projected; and FIG. 7 a flow diagram of a method for determining 3D coordinates of at least one predetermined point.

In a schematic depiction, FIGS. 1A and 1B show a user 100 in the measurement region of an apparatus for determining 3D coordinates of predetermined points. Of the apparatus, only an image recording device 10 and an illumination source 20 are shown as elements. Both the image recording device 10 and the illumination source 20 are aligned toward a measurement region. The measurement region is not separately identified in FIGS. 1A and 1B. The user 100—more precisely, the head of the user 100 with spectacles frame 101 arranged thereon in the usage position—is arranged in the measurement region. In the terminology used in the preceding, the head of the user 100 and the spectacles frame 101 arranged thereon in the usage position form an object 105 that is arranged in the measurement region of the device. The usage position is defined in the standards indicated in the preceding. The device is designed and provided to detect predetermined points of the object 105 and to calculate their 3D coordinates. This serves to calculate optical parameters such as, for example, a pupillary distance, a face form angle, a spectacle lens inclination, a corneal vertex distance of the system of spectacles and eye, and a fitting height of the spectacle lenses as optical parameters [sic].

The image recording device 10 may be designed as a digital camera and has an optical axis 11. The optical axis 11 is directed, by the center point of a capture lens and/or a diaphragm opening of the image recording device 10, onto the measurement region and defines a recording direction of an image that can be recorded by said image recording device 10. The illumination source 20 is similarly directed toward the measurement region so that an illumination direction 21 is directed from the illumination source 20 onto the measurement region. The illumination direction 21 thereby defines a direction in which light is emitted from the illumination source 20 onto the measurement region. The illumination source 20 is designed and provided to emit light in the form of a structured pattern. The pattern emitted by the illumination source 20 is thus designed as a structured light pattern. This structured light pattern is projected onto the object 105, in the shown exemplary embodiment onto the head of the user 100 and the spectacles frame 101 arranged thereon. The structured light pattern may in particular be designed as an essentially monochromatic light pattern, thus for example be made up of light of a single wavelength. The light pattern thereby has light and dark bands, thus partial regions illuminated by the light and partial regions of the light pattern that are not illuminated by the light. The light pattern may have features with a contrast transition, in particular contrasting edges, as well-defined transitions, arranged at least partially in straight lines, from a partial region of the pattern with a high light intensity to a partial region of the pattern with a low light intensity, and vice versa. A partial region of low light intensity may, for example, hereby be designed as a partial region of the light pattern whose light intensity is at least 50% lower, preferably at least 75%, particularly preferably at least 95% lower than the light intensity of the adjacent partial region with the high light intensity. In one exemplary embodiment, the at least one partial region with lower and/or weaker light intensity is not illuminated by the illumination source.

The pattern projected by the illumination source 20 into the measurement region is variable. This means that the illumination source 20 may emit different patterns. For this, the illumination source 20 may, for example, be designed as a screen with individual pixels that can be activated individually. A variation of the pattern emitted by the illumination source 20 may thus be based on a variation of the light that is emitted by each individual pixel of the illumination source 20. The illumination source may thus vary the pattern it emits on a pixel-by-pixel basis. Sub-groups of pixels may hereby be associated with partial regions of the pattern so that, by means of an activation of one or more sub-group(s) of pixels, the light intensity of a partial region or multiple partial regions of the pattern is controlled and/or regulated.

The image recording device 10 and the illumination source 20 are arranged with a specified relation to one another. This may mean that the image recording device has a known distance in three-dimensional space from the illumination source 20. Furthermore, the arrangement, and in particular the travel direction of the optical axis 11, may be specified, just like the arrangement and travel direction of the illumination direction 21. In particular, an angle between the optical axis 11 and the illumination direction 21 may be specified.

In the embodiment shown in FIGS. 1A and 1B, the optical axis 11 and the illumination direction 21 intersect at an intersection point 30. This intersection point 30 is arranged in the measurement region of the device. In the shown exemplary embodiment, the intersection point is arranged approximately between the eyes of the user, on the bridge of the nose. In alternative embodiments, the optical axis 11 and the illumination direction 21 do not necessarily need to intersect at a point; rather, they may merely have the slightest distance from one another. Such a slightest distance from one another may be at most 10 cm, for example. From the specified arrangements of the image recording device 10 and the illumination source 20, as well as of the associated optical axis 11 and the illumination direction 21, a calculation of the 3D coordinates of predetermined points in the image recorded by the image recording device 10 may take place by means of triangulation.

Alternatively, or in addition to this, the apparatus may be adjusted, calibrated, and/or fixed with a statically fixed arrangement of the image recording device 10 relative to the illumination source 20. A calibration object may be used to calibrate the apparatus, thus in order to capture and/or store the specified relation of the illumination source to the image recording device 10. A formula and/or a correspondence table may be applied as an adjustment for every single pixel of the illumination source 20, which formula and/or correspondence table associates a 3D coordinate with every single pixel of the illumination source 20 depending on at which location in the recorded two-dimensional image of the image recording device this pixel is arranged. Since the illumination source 20 and the image recording device 10 are arranged relative to one another so that the optical axis 11 and the illumination direction 21 either intersect at an angle, or the projections of these two straight lines on a horizontal and/or vertical plane intersect at an angle (these two straight lines are thus not aligned parallel to one another), a correlation cited in the preceding can be determined, calculated and/or stored for each pixel of the illumination source.

A 3D coordinate in the measurement region may thus be associated with each 2D coordinate of each pixel in the recorded image, thus for example each XY coordinate in the image recorded by the image recording device 10. In general, the 2D coordinates in the recorded image are dependent on the position of the respective illuminated point of the object relative to the position of the image recording device 10 and the illumination source 20. Such a correlation may be predetermined and/or stored at least for those object points that are located in the measurement region. Expressed mathematically, an association function $f_p$ of the following form may be pre-stored for each pixel p of the illumination source:

$$f_p(x,y) \longmapsto (x',y',z').$$

The coordinates (x, y) are hereby 2D coordinates of that point in the recorded image that is illuminated by the pixel p. The 2D coordinates (x, y) may hereby also be the coordinates of a center point of a region illuminated by the pixel p in the recorded image. The coordinates (x', y', z') are 3D coordinates of that location and/or point in the measurement region that is illuminated by the pixel p and that thereby causes the illuminated point and/or region in the recorded image.

For each pixel p or a plurality of pixels p of the illumination source 20, the association function $f_p$ may be pre-stored in a storage module of the device in the form of a mathematical function and/or in the form of an association table.

The 3D coordinate of the point of the object 105 that is so illuminated and/or marked may thus be determined via determination of that pixel of the illumination source 20 that illuminates a detected or predetermined points [sic] of the object 105. In other words: upon implementation of the method, for example, it may be determined which pixel of the illumination source 20 illuminates the predetermined point detected in the image. From this, the associated 3D coordinate may be calculated either by means of triangulation or via the association function described in the preceding. The determination of the 3D coordinates may take place automatically from those image data that are associated with or correspond to the image recorded by the image recording device 10.

In a schematic representation, FIG. 2 shows an image that has been recorded and generated by the image recording device 10. In the shown exemplary embodiment, the image data of a schematically depicted front recording of a partial region of the head of a user 100 with spectacles frame arranged in the usage position. Only two spectacle lenses 110, a spectacles frame 101, a right eye 112, and a left eye 114 of the user 100 are hereby shown in FIG. 2. In FIG. 2, a right pupil center point RPM of the right eye 112 and a left pupil center point LPM of the left eye 114 are shown as predetermined points. FIG. 2 also shows a boundary 120 of the right spectacle lens edge or spectacles frame edge 102 around the right eye 112, and a boundary 122 of the left spectacle lens edge or spectacles frame edge 102 around the left eye 114, in a boxing system. Furthermore, a nasal right frame point NRF and a temporal right frame point TRF of a horizontal plane HR are shown in a reference system of the user 100, with the spectacles frame edge 102 in relation to the right eye 112. In addition to this, in FIG. 2 an upper right frame point ORF and a lower right frame point URF of a vertical plane VR are shown in a reference system of the user VR, orthogonal to the horizontal plane HR of the user 100, with the spectacles frame edge 102 in relation to the right eye 112.

Analogous to this, a nasal left frame point NLF and a temporal left frame point TLF of a horizontal plane HL in the reference system of the user 100 are is [sic] shown with the spectacles frame edge 102 in relation to the left eye 114. In addition to this, shown in FIG. 2 is an upper left frame point OLF and a lower left frame point ULF of a vertical plane VL in the reference system of the user 100, orthogonal to the horizontal plane HL of the user 100, with the spectacles frame edge 102 in relation to the left eye 114.

FIG. 2 shows points of the system comprising the head of the user 10 and the spectacles frame 101 arranged thereon in the usage position. In this system, the 3D coordinates of predetermined points are determined for the determination of optical parameters that may be used to produce and/or calculate individual spectacle lenses, in particular individual ophthalmic spectacle lenses. According to one embodiment, the 3D coordinates of the following ten points are hereby determined:

right pupil center point RPM,
left pupil center point LPM,
temporal right frame point TRF and temporal left frame point TLF,
right nasal frame point NRF and left nasal frame point NLF,
upper right frame point ORF and upper left frame point OLF, and
lower right frame point URF and lower left frame point ULF.

The most important optical parameters may be determined from the 3D coordinates of the aforementioned ten points as predetermined points.

In the method, the predetermined points are hereby specifically marked by the pattern projected by the illumination source 20. In particular, the eight frame points, namely the points ORF, NRF, URF, TRF, OLF, TLF, ULF, and NLF, may thereby be marked in that a contrasting edge of the pattern in the recorded image intersects the spectacles frame edge (and/or spectacle lens edge) 102 at an angle. The intersection angle may in particular be an essentially right angle, and/or an intersection angle between approximately 30° and approximately 150°, in order to distinctly mark the respective frame point in the image.

Such a contrasting edge of the projected pattern may, for example, be provided by a line that is specifically placed through the respective frame point ORF, NRF, URF, TRF, OLF, TLF, ULF, and/or NLF. For example, a respective line might be projected onto the eye along the vertical planes BR and VL, and a respective line might be projected onto the eye through the horizontal planes HR and HL, in order to specifically mark the eight frame points. The lines projected onto the object 105 may, for example, merely be formed to be a single pixel wide in order to enable an optimally precise and targeted marking of the predetermined points. However, a contrasting edge between an unilluminated region of the pattern and an illuminated region of the pattern may be used as a pattern.

An indirect determination of the associated 3D coordinates may take place to detect and mark the two pupil center points LPM and RPM. Since the human pupil is biologically provided to conduct a majority of the visible light into the inside of the eye, and not to reflect it, there may be technical difficulties in marking the pupil center point by means of a feature of the pattern. Therefore, the 3D coordinates of the pupil center points LPM and RPM may in some cases not be determined directly like the frame edge points. Within the scope of the method, the pupil center points themselves are therefore not directly marked by a feature of the projected pattern; rather, instead points adjacent to the pupil center points LPM, RPM are marked, for example points on the iris of the respective right or left eye 112 and 114.

In FIG. 2, instead of the right pupil center point RPM three iris points are marked with the features R1, R2, and R3 of the pattern, which three iris points are arranged on the iris of the right eye 112, adjacent to the right pupil center point RPM. These three iris points may first be marked as predetermined points of the object 105 by the features R1, R2, and R3 of the pattern. The 3D coordinates of the three associated iris points may subsequently be determined as in the preceding. The 3D coordinates may, for example, be determined as a mean value of the 3D coordinates of the three iris points, in particular depending on a geometry of the three iris points relative to one another on the right respective eye.

Analogous to this, in FIG. 2 the left pupil center point LPM is also not directly marked by a feature of the pattern; rather, only three points on the iris of the left eye 114 that are arranged adjacent to the left pupil center point LPM are marked. These three points are marked by the three features L1, L2, and L3 of the pattern. Their 3D coordinates may be determined as described in the preceding. The 3D coordinates of the left pupil center point LPM may be determined depending on the 3D coordinates of these three iris points.

FIGS. 3A, 3B, and 3C show three different projected patterns A, B, and C, with strongly pronounced contrasting edges. The partial regions that are shown dark in the patterns A, B, C are thereby unilluminated, whereas the partial regions that are shown light are illuminated by the illumination source 20. Patterns A, B, and C may thus be designed as monochrome patterns that, for example, are composed exclusively of unilluminated partial regions and partial regions that are illuminated (for example with a single color) that are respectively delimited from one another by means of contrasting edges. The contrasting edges are thereby formed essentially as straight lines, at least in segments. Straight-line segments of the contrasting edges form features of the pattern A, B, C that are particularly well suited for marking of specified points.

The monochromatic light, for example, may hereby be light of a single defined wavelength, for instance, or may however be composed of light of different wavelengths, for example white light. In particular, the light may also be radiated in a wavelength range that is not registered by the user 100, for example in the infrared range, and therefore does not blind said user 100.

The pattern is projected in at least one color, with at least one wavelength and/or in at least one wavelength range, into the measurement region that may be recognized and/or detected in the image recorded by the image recording device 10, thus in which the image data is contained so as to be detectable. The image recording device 10 that is used is thus sensitive in the wavelength range used by the illumination source 20.

In a schematic depiction, FIG. 4 shows only one half of the image recorded by the image recording device 10. In the shown image data, only the left eye 114 of the user 100 is shown that is surrounded by the left spectacles frame edge 102. Analogous to this, the entire recording may also contain the right pupils as well as the right eye 112 of the user 100 that is surrounded by the right spectacles frame edge 102. In general, the head of the user 100 is preferably arranged in a measurement region so that both eyes 112 and 114 of the user 100, which are respectively completely surrounded by the spectacles frame edge or spectacle lens edge 102, are completely and frontally depicted in the image data produced by the image recording device 10.

FIG. 4 in particular shows the left pupil center point LPM as a center point of four iris points of the left eye 114 that are marked by four features L1, L2, L3, and L4 of the pattern emitted by the illumination source 20. Each of the features L1 through L4 has at least two crossed lines whose intersection point mark [sic] an iris point on the iris of the left eye 114. The 3D coordinates of the associated four points on the iris of the user 100 may be determined with the aid of the specified relation of the image recording device 10 to the illumination source 20. The 3D coordinates of the left pupil center point LPM may be determined depending thereon, in particular as a mean value of the 3D coordinates of the four iris points. In addition to this, that coordinate or those coordinates that indicates or indicate the distance from the image recording device 10 may be corrected on the basis of specified measurement data. These specified measurement data may take into account and/or include in the calculation that the eye ball is round in shape, and the pupil center point is therefore displaced outward—for example in the direction of the image recording device 10—relative to the marked iris points.

In general, the 3D coordinates of a pupil center point may be determined in that the 3D coordinates of at least two adjacent points are initially determined (for example from iris points on the iris of the same eye) from which the 3D coordinates of the pupil center point are determined. This may take place with the assistance of either three iris points as shown in FIG. 2, or may take place with the assistance of at least four iris points as shown in FIG. 4.

FIG. 4 furthermore shows a feature M1 of the pattern emitted by the illumination source. The feature M1 is designed as an essentially vertically arranged line of the pattern of the illumination source 20 that is situated essentially orthogonal to a travel direction of the spectacles frame edge 102. Since the spectacles frame edge 102 is arranged closer to the image recording device 10 than the face of the user 100 arranged behind it, the feature M1 in the image data shown in FIG. 4 illuminates multiple feature segments M1', M1" and M1'" offset laterally from one another. The two feature segments M1' and M1''' that illuminate the face of the user 100 in the image are thus offset laterally from the feature segment M1'' that illuminates a segment of the spectacles frame edge 102 in the image. All three feature segments M1', M1'', and M1''' are shown in the image data as respective, essentially vertical lines. Due to the spatial offset of the spectacles frame edge 102 from the face of the user 100 situated behind this, the feature of the pattern in the image data exhibits two jumps, namely above the feature segment M1' on the face, relative to the feature segment M1'' on the spectacles frame edge 102, and above this back to the face again, namely relative to the feature segment M1'''. Via the targeted marking with the feature M1 of the pattern, which coordinates the lower left frame point ULF has may be determined as a predetermined point. For this, in an intermediate step it may be determined which pixels of the illumination source 20 illuminate the feature segment M1'', and which association function $f_p$ is associated with these pixels.

FIG. 5A shows a first pattern 200 that is projected by the illumination source 20 into the measurement region, in particular along the illumination direction 21. The first pattern 200 has only one essentially rectangular illuminated partial region, and a likewise essentially rectangular unilluminated partial region. A feature M1 of the first pattern 200 is arranged between the illuminated partial region and the unilluminated partial region of the first pattern 200. The feature M1 is designed as a contrasting edge, in particular as a contrasting edge that is formed in straight lines at least in segments. A predetermined point of the object 105 may be marked with the straight-line segment of the contrasting edge of the feature M1.

In a schematic depiction, FIG. 6A shows a first image 300 that is recorded by the image recording device 10. Only one eye of the user 100, namely the left eye 114, is contained in this image. As an alternative to this, the image might also contain both eyes of the user, respectively surrounded by the spectacles frame edge (and/or spectacle lens edge) 102. The first image 300 recorded in such a manner shows how the first pattern 200 of the illumination source 20 illuminates a partial region of the face of the user 100 and the spectacles frame 101 arranged thereon in the usage position. It is hereby to be noted that the depiction shown in FIG. 6A is merely schematic. In realistic recordings, the contrasting edge—thus the feature M1—would no longer be formed in a continuous straight line, but rather depending on the surface structure of the illuminated object, thus the face of the user 100 as well as of the spectacles frame edge 102. However, for reasons of a simple depiction, only this schematic depiction in which the feature M1 continues to be depicted as a straight line is shown in Figures.

Upon implementation of the method for determining the 3D coordinates of predetermined points, the predetermined points for which the 3D coordinates should be detected are first determined in the recorded first image 300. The left pupil center point LPM and the upper left frame point OLF are shown in FIG. 6A as examples of these predetermined points. The predetermined points may be detected automatically in the image data of the first image 300, in particular with software assistance. In the image data of the first image 300, the predetermined points may be detected either by means of image processing and/or by means of a manual selection. Predetermined points may thereby in particular be the frame points and pupil center points cited in the preceding, but also corners of the eye, corners of the mouth etc.

The predetermined points are re-detected in subsequent images that, for example, are shown in FIGS. 6B, 6C, and 6D (described in the following). It is hereby advantageous if subsequent images are created as quickly as possible in succession, for example multiple images per second. The images are preferably created in series with a repetition frequency of at least 10 Hz, particularly preferably of at least 20 Hz.

The illumination source 20 is used as a projector with which a variable pattern is projected onto the object arranged in the measurement region. The first pattern 200 is initially projected by the illumination source 20 onto the face of the user 100. The first pattern 200 is in particular superimposed with the predetermined points of the object 105. In the image data of the first 300, a check is performed as to whether one or all of the predetermined points are marked by a feature of the first pattern 200. As shown in FIG. 6A, however, none of the predetermined points is marked by the feature M1 of the first pattern 200. This means that none of the features of the first pattern 200 coincides with one of the predetermined points in the image data of the first image 300. In particular, the straight-line segment of the contrasting edge of the feature M1 does not travel through one of the predetermined points, but rather is arranged at a distance therefrom. Therefore, the 3D coordinates of the predetermined points are not yet calculated from the image data of the first image 300.

FIG. 5B shows a second pattern 210 that is likewise radiated by the illumination source 20. After it is established, as described in the preceding, that the predetermined points are not all marked by a feature of the first pattern 200 in the first image, an iteration of the method with varied pattern takes place. The second pattern 210 may hereby be generated from a variation of the first pattern 200. For example, in the variation an unilluminated partial region (shown to the left in FIG. 5A) in the first pattern 200 is divided up into two new, essentially rectangular partial regions of the second pattern 210, of which one is illuminated and the other is unilluminated.

The larger and illuminated partial region (shown to the right in FIG. 5A) of the first pattern 200 was divided into four parts in the second pattern 210, namely into four new, essentially rectangular partial regions of the second pattern 210. Of these four new, essentially rectangular partial regions, in the second pattern 210 two are illuminated and two are unilluminated. Overall, the second pattern 210 has three illuminated and three unilluminated, essentially rectangular areas. Partial regions and/or areas that adjoin one another are thereby always alternately illuminated and unilluminated. Therefore, contrasting edges result between the aforesaid illuminated and unilluminated partial regions/areas, which contrasting edges are suitable as features of the pattern for marking predetermined points of the object 105. All of these contrasting edges have, at least in segments, an essentially straight-line region with which the predetermined points may be marked.

Overall, the pattern projected by the illumination source 20 may be essentially formed like a chessboard. That means that the patterns have exclusively essentially rectangular partial regions and/or partial areas that are either illuminated or not illuminated over the entire area. Furthermore, the partial regions are alternately illuminated and not illuminated in a vertical direction and/or in a horizontal direction. Essentially horizontally arranged and essentially vertically arranged contrasting edges thereby result as features of the variable pattern. This chessboard-like arrangement may be valid for all patterns that are projected by the illumination source 20 into the measurement region. The individual "chessboard fields", thus the illuminated and unilluminated partial regions or partial areas of the pattern, may hereby be dimensioned differently, for example as rectangles.

Such a projected light pattern may, for example, be designed in that essentially perpendicular [sic] and essentially vertical lines that form essentially rectangular fields are drawn across the two-dimensional emission surface or pattern surface.

In a schematic depiction, FIG. 6B shows a second image 310 of the left eye 114 encircled by the spectacles frame 101, onto which left eye 114 the second pattern 210 is projected. The second image 310 is converted into image data in which the predetermined points are detected again. Furthermore, and in turn, a check is performed as to whether all predetermined points of a respective feature of the second pattern 210 are marked. Since this is also not yet the case in the second image 310, the projection pattern is varied again in a next step.

FIG. 5C shows the new variation using a third pattern 220 in which the number of illuminated and unilluminated partial regions and/or partial areas of the pattern, arranged like a chessboard, is increased further. In the variation, both the number of geometric shapes contained in the pattern has been increased and their average size has been reduced. The number of contrasting edges of the pattern is thereby increased. In the variation, both the number of dividing lines that are essentially aligned vertically has been increased by the pattern, and the number of essentially horizontal dividing lines traveling through the pattern between the individual partial regions/partial areas of the pattern [sic].

In a schematic depiction, FIG. 6C shows a third image 320 of the left eye 114 of the user 100, encircled by the spectacles frame 101, onto which the third pattern 220 shown in FIG. 5C is projected. In this image, a check is also made as to whether the predetermined points are respectively marked by a feature of the third pattern 220. If the check turns out to be negative, the pattern is varied further.

In a schematic depiction, FIG. 5D shows a fourth pattern 230 that is based on a variation of the third pattern 220. The fourth pattern did not thereby necessarily arise directly from the third pattern 220. Additional patterns (not shown in Figures) for the recording of additional images may be generated and projected into the measurement region between the generation of the third pattern 220 and the generation of the fourth pattern 230. In each variation, the number of contrasting edges of the pattern may be increased, in particular in the regions in which the predetermined points of the object 105 are arranged.

In a schematic depiction, FIG. 6D shows a fourth image 330 of the eye encircled by the spectacles frame 101, onto which eye the fourth pattern 230 is projected. As shown in FIG. 6D, in particular the four left frame points OLF, TLF, ULF, and MLF are respectively marked by a feature of the fourth pattern 230. A contrasting edge of the fourth pattern 230 is hereby respectively arranged essentially orthogonal to the travel direction of the spectacles frame 101. An intersection point between the spectacles frame 101 and the respective feature of the fourth pattern 230 serves to mark the respective predetermined point, thus in this instance of the respective left frame point in the fourth image 330. From this marking, the respective associated 3D coordinate of the predetermined point may be determined and/or calculated with the specified relation of the illumination source 20 to the image recording device 10, for example with the aid of the respective association functions $f_p$.

The calibration of the design, thus the specified relation of the image recording device 10 to the illumination source 20, may be taken into account and/or used in the variation of the pattern. Since the distance of the device from the object 105 is not initially known, the distance is determined iteratively via pattern projection and a localization of the features of the respective projected pattern in the respective recorded image. If the predetermined points are superimposed with a respective feature of the projected pattern, and if the individual features of the projected pattern may be associated in the recorded image with elements of the illumination source 20, thus with their respective pixel or pixels, a sufficiently precise determination of the 3D coordinates of the individual, predetermined points of the object 105 may take place. All 3D coordinates may thereby be calculated using a single image, namely the last recorded image, using the fourth image 330 in the exemplary embodiment. A solution of the correspondence problem, thus the location of points corresponding to one another in two recordings that have been created from different recording directions, is dispensed with.

In other words, the apparatus is designed and provided to perform an active and adaptive video centering, wherein a projected pattern is varied and, so to speak, is updated to the predetermined points of the object 105. An increase in the spatial resolution of successive following recordings, thus recorded images, is achieved via the updating of the projection. Stable methods of the structured illumination based on pattern sequences may hereby be used.

In the image processing, known methods may be used to detect the predetermined points in the image, as well as to check whether the respective predetermined points are marked by a feature of the projected pattern. For a facial recognition and/or localization of features of the face, thus to detect the predetermined points, cascade classifiers may be used (for example as described in detail in the article "Fast Multi-view Face Detection" by M. Jones and P. Viola"), or descriptor vectors in which key points are initially determined that are described by a descriptor in order to then determine an agreement in comparison with a reference descriptor. Among the descriptors are, for example, FAST, FREAK, BRISK etc. These methods are known in principle to the person skilled in the art.

A movement of the user 100, thus a movement of the object 105, in successively recorded images may be determined via key points and be taken into account in the method. Alternatively or additionally, a calculation of an optical flow may also take place in order to track the movement and taken it into account for subsequent pattern projections.

Via the consideration of the movement of the object and the complete determination of all 3D coordinates from a single recording, artifacts may be excluded that may otherwise occur in a sequence of successive, structured, illuminated recordings, and may adulterate the result.

A plurality of patterns that may be used as a structured illumination of the measurement region may be resorted to as a projection pattern and/or light pattern that is radiated by the illumination source 20. A dense and/or complete 3D reconstruction of the measurement object or of its surface is not sought in the method, rather merely the determination of individual predetermined points, for example up to 100 such selection points, preferably up to 50 such selection points, particularly preferably from 8 to 12 selection points. Therefore, in a first step a large-area, largely unstructured pattern may be projected as a first pattern. In the event that, or as soon as, the at least one predetermined point is arranged within the projected pattern, a sequence to increase the spatial resolution of the pattern may be begun, thus the variation of the of the projected pattern. This is normally the case if the at least one predetermined point is arranged in the measurement region. The pattern or patterns may thus be designed so that it/they essentially superimpose(s) on the entire measurement region.

For example, binary codes and/or Gray codes are suitable as possible variation sequences. Such codes are, for example, explained in detail in the article "Structured-light 3D surface imaging: a tutorial" by J. Geng.

Although a static use of colors for coding appears disadvantageous at a first glance since the plurality of spectacles frames entails a likewise large plurality of colors, the projected pattern may additionally also be color-coded. For example, a respective color of the pattern that is complementary to the background might be selected, in particular for marking the spectacles frame. The contrast in the recorded image is thereby increased further, which may improve the determination of the 3D coordinates of the predetermined points.

A one-dimensional sequence of patterns, thus for example a stripe pattern, may be used to mark elements with a small physical dimension, thus for example to mark the frame edge of metal spectacles. The predetermined point on the frame edge is hereby specifically marked by a contrasting edge of the stripe pattern. In general, contrasting edges of the projected pattern should have a comparably large intersection angle with the largest dimension of the surroundings of the predetermined point. For example, an essentially straight-line contrasting edge in the image may thus be situated essentially orthogonal to the travel direction of the respective segment of the frame edge. In this instance, a detection and/or localizer of the predetermined point may be enabled in that a dimension of that object element on which the predetermined point is arranged travels in a different direction than that direction in which the contrasting edge of the pattern is arranged. A discontinuity of the contrasting edge in the recorded image, for example as shown at the feature segments M1', M1'', and M1''' of the feature M1 in FIG. 4, is hereby incorporated into the image.

The predetermined points are thereby points of an object element and/or object feature, for example points on or at the spectacles frame edge and/or spectacle lens edge. Points, for example the pupil center point as a selection point of the associated pupils, may likewise be predetermined as an object element and/or object feature.

As described in the preceding, due to a lack of retroreflection of the projected pattern, an averaging of the 3D coordinates of multiple surrounding points may be resorted to for the determination of the 3D coordinates of the pupil center points.

The determination of the 3D coordinates of the predetermined points may take place in parallel, thus cascaded with regard to a single image, or may take place in chronological succession. Predetermined points that are spatially situated close to one another but, for example, could not be uniquely identified due to discontinuities in the pattern may hereby be detected serially in order to avoid ambiguities. These successively determined 3D points may be associated with other 3D points via 3D points that are determined in multiple images.

The projection of the pattern may, for example, be improved in that the reflectivity at the predetermined points and/or global illumination effects are taken into account.

No offsetting of successively recorded images is required in the method. Such an offsetting may be entirely omitted. Successively recorded images may in fact be comparatively considered for calculation of an object movement, in particular to calculate an optical flow in the recorded images; however, a single, normal digital camera (in contrast to a 3D camera) may hereby be used as an image recording device. In particular, only a single, two-dimensional image may or must be evaluated to calculate the 3D coordinates, in contrast to methods in which multiple images (for example with phase-shifted patterns) are compared with one another or 3D cameras are used.

The video centering described in the preceding may, for example, also be used in the dental or orthopedic field, in which model-based surfaces or bodies are used that have a defined number of parameters for their description.

In a flow diagram, FIG. 7 shows steps of a method for determining 3D coordinates of predetermined points of an object. The flow diagram hereby shows in particular steps that may be performed by a computer program product.

At the beginning, in step 400, the object is introduced into the measurement region that, for example, may be designed as a well-defined measurement volume. A start pattern is selected as a first pattern (see also step 404) that is projected onto the object. An image of the object onto which the start pattern is projected is recorded in step 401.

The recorded image, or more precisely the digital image data of the recorded image, are subsequently analyzed in step 402. In this step, an image analysis of the image data takes place in order to detect the predetermined points in the recorded image. The predetermined points are referred to as selection points in the flow diagram shown in FIG. 7. In general, these selection points are individual, selected, and predetermined points of the object whose 3D coordinates should be determined.

Following the image analysis 402, in step 403 the individual selection points in the image data are reviewed as to whether they are respectively marked with a feature of the pattern. If this is not yet the case, in step 404 the projected pattern is varied and the varied pattern is projected onto the object in the measurement region. The recording of a new image of the object onto which the varied pattern is projected follows in step 401. The method is iterated until it is established, in step 403, that all selection points are marked with a feature of the pattern. The measurement may thereupon be concluded in step 405, and the 3D coordinates of all selection points, thus of all points to be determined, may be determined from the most recently recorded image or the associated image data. This takes place using the specified relation of the illumination device to the illumination source, for example using the known association function $f_p$.

Furthermore, two optional steps of the method which may likewise be implemented within the scope of the method are shown in the flow diagram. In a first option that is identified with the reference character 406 in the Figure, the time curve of the position of some or all selection points may be tracked, thus the time curve of the predetermined points. This enables a prediction about where the selection points are probably arranged upon recording of the next image. This may be taken into account in the variation of the pattern. A movement of the object in the following recordings may thus be predicted in order to accordingly adapt the projected pattern. This first option 406 is helpful in particular in applications in which an object is located on a conveyor belt. In addition to this, slow oscillations—at least oscillations that are slow in comparison to the image recording rate—may be compensated for, for example fluctuations of a human in front of a measurement device whose face should be recorded. These fluctuations may either be compensation movements or breathing movements.

As an additional option of the method, a step 407 may be provided in which the selection points are determined in the recording, for example manually by an operator. Such an operator may be an optician, for example. In a fully automatic determination of all selection points, a manual or semi-automatic selection of the selection points may thus also take place. For example, a one-time process may hereby be involved in which the user—for example an operator—marks the predetermined points only in the first recording. The search for the predetermined points is then to be performed more simply and robustly in a computer-assisted or software-assisted manner in the subsequent recording s, in particular via robust, previously known image processing methods, for example a pattern matching or a correlation of the image points with one another.

As FIG. 5A shows, the first pattern 200 may be used as a static start pattern for the method shown in FIG. 7, for example. The first pattern 200 has only a single transition from light to dark or vice versa as feature M1, which may be uniquely detected in the image data and be associated with a distance from the image recording device 10. A distance determination, for example in order to estimate the distance of the test subject (thus of the user 100) may already take place from this single transition. The distance determination may take place analogous to a light section method with a projected light line. The distance information in the vertical, which is obtained via the vertically arranged transition (feature M1) between the light and dark partial region of the first pattern 200, may be transferred, based on a model, from the measurement location to the location in the two-dimensional image at which a selection point has been found by the image processing in step 402.

In a first approximation, for example, a model that is designed as a plane that is arranged parallel to the camera plane may be used to transfer the distance information from the measurement location to the selection point.

In general, a mean distance of the object 105 in the measurement region may be determined in that, for example, a mean value of the determined distances of the vertical line (feature M1) of the first pattern 200 is determined in the recorded first image 300. This yields the mean distance of the object 105 in the measurement region.

Alternatively, a 3D face model for the object 105 may already be adopted and/or used and/or considered for a first distance determination. An analogous or associated point in the three-dimensional face model may thus be associated with a selection point detected in the two-dimensional image, for example a point in the first image 300. A difference or a distance (for example in the projection direction of the image recording device 10, thus in the direction of the optical axis 11) of this detected selection point from the associated point in the three-dimensional face model may be used as a distance correction value in order to better bring the positioning of the features of the pattern into agreement with the selection point. Given variation of the pattern, a distance correction value may thus be taken into account that is based on a deviation of the detected selection point from an associated point in the face model. In one embodiment, the distance correction value may also be determined from a 2D distance of the detected selection point from the associated point in the face model, thus from the image data of the recorded two-dimensional image.

A new pattern, for example the second pattern 210 shown in FIG. 5B and subsequently the third pattern 220 shown in FIG. 5C, may be calculated from the distance determined in such a manner, or the model distance in 3D, together with the two-dimensionally determined selection points (see step 402). A pattern is hereby selected in which edges of the pattern are placed at the determined selection points via the projection. The pattern is thus varied so that features of the pattern predictively travel through the locations of the selection points that have until now only been determined in two dimensions.

It may hereby be taken into account that the individual contrasting edges of the pattern do not superimpose, such that a unique association of the projected patterns to the individual features of the pattern is no longer possible. It may thus be taken into account in the variation of the pattern that a unique association capability of the features of the projected pattern is present. This may take place under consideration of a distance change that is to be anticipated, from the image recording device along a position of the object that is lateral in the image (for example slope from nose to eye socket), and/or via a successive increase of the number of features (contrasting edges) of the pattern. For example, given variation of the pattern, only a single vertical and/or horizontal contrasting edge may thus be arranged more per iteration step in a previously homogeneous partial region of the pattern.

According to one embodiment, given variation of the pattern at most one new vertical and/or horizontal contrasting edge is/are added per homogeneous area region and/or partial region. This reduces the danger of a superposition of the features of the pattern, and thus the danger of a reduction of the unique association capability in the recorded image.

As soon as all selection points to be determined are covered by a respective feature, in particular an edge, of the pattern in the projection, for example as shown in FIG. 6D, the measurement can be concluded. All 3D coordinates of the selection points may subsequently be calculated using a single 2D image (see step 405 and fourth image 330).

According to one embodiment, the method serves to determine the 3D coordinates of one to fifty predetermined points (selection points), preferably of five to twenty selection points, particularly preferably from 10 to 16 selection points.

REFERENCE LIST 10 image recording device
11 optical axis
20 illumination source
21 illumination device
30 intersection point
100 user
101 spectacles frame
102 spectacle lens edge/spectacles frame edge
105 object
110 spectacle lens
112 right eye
114 left eye
120 boundary of the right eye in a boxing system
122 boundary of the left eye in a boxing system
200 first pattern
210 second pattern
220 third pattern
230 fourth pattern
300 first image
310 second image
320 third image
330 fourth image
400-407 method step
A pattern
B pattern
C pattern
LPM left pupil center point RPM right pupil center point
NRF right nasal frame point
TRF right temporal frame point
NLF left nasal frame point
TLF left temporal frame point
ORF upper right frame point
URF lower right frame point
OLF upper left frame point
ULF lower left frame point
HR horizontal plane through the right pupil center point
VR vertical plane through the right pupil center point
HL horizontal plane through the left pupil center point
VL vertical plane through the left pupil center point
R1, R2, R3 features at the right eye
L1, L2, L3, L4 features at the left eye
M1 feature
M1', M1", M1'" feature segment

The invention claimed is:

1. A method for determining 3D coordinates of at least one predetermined point of an object, the method comprising:
   a) arranging the object in a measurement region;
   b) projecting, by a variable illumination source, a variable pattern onto the object arranged in the measurement region;
   c) recording, by an image recorder that is arranged in a specified relation to the variable illumination source, an image of at least one partial region of the object illuminated by the variable illumination source;
   d) detecting the at least one predetermined point in the recorded image;
   e) determining the 3D coordinates of the at least one predetermined point from the recorded image under consideration of the specified relation of the image recorder to the variable illumination source, in the event that a check of the recorded image yields that the at least one predetermined point in the recorded image is marked by a feature of the variable pattern; and
   f) in the event that the check of the recorded image yields that the at least one predetermined point in the recorded image is not marked by a feature of the variable pattern, varying the variable pattern that is projected by the variable illumination source onto the object, and subsequently repeating the steps c) through e) under illumination with the varied pattern.

2. The method according to claim 1, wherein the variable pattern projected onto the object is varied, and subsequently the steps c) through e) are repeated with the varied pattern, until the at least one predetermined point in the recorded image is marked by a feature of the variable pattern and the 3D coordinates of the at least one predetermined point are calculated.

3. The method according to claim 1, wherein the variable pattern is specifically varied so that the varied pattern predictively marks the at least one predetermined point of the object with a feature of the varied pattern.

4. The method according to claim 1, wherein successive images are recorded with a repetition frequency of at least 10 Hz until the 3D coordinates of the at least one predetermined point are calculated.

5. The method according to claim 1, wherein the variable pattern has at least one essentially horizontal and/or vertical contrasting edge as a feature that is displaced upon variation of the pattern.

6. The method according to claim 1, wherein the object is a head of a user with a spectacles frame arranged thereon in the usage position.

7. The method according to claim 6, wherein at least one of the following points is used as the at least one predetermined point: a pupil center point, an inner temporal frame point, an inner nasal frame point, an inner frame point above the pupil, and/or an inner frame point below the pupil.

8. The method according to claim 6, wherein optical parameters of the user are determined from the determined 3D coordinates of the at least one predetermined point.

9. The method according to claim 6, wherein the 3D coordinates of a pupil center point of the user are determined in that at least two points adjacent to the pupil center point are marked as predetermined points with respectively at least one feature of the variable pattern, from which 3D coordinates the 3D coordinates of the pupil center point are estimated.

10. A computer program product stored on a non-transitory computer readable medium to perform or control a method according to claim 1.

11. A method for determining 3D coordinates of at least one predetermined point of an object, the method comprising:
    a) arranging the object in a measurement region;
    b) projecting, by a variable illumination source, a variable pattern onto the object arranged in the measurement region wherein the variable pattern has a number of geometric shapes with contrasting edges as features, and given variation of the pattern the number of geometric shapes, and thus the number of contrasting edges of the pattern, is increased;
    c) recording, by an image recorder that is arranged in a specified relation to the variable illumination source, an image of at least one partial region of the object illuminated by the variable illumination source;
    d) detecting the at least one predetermined point in the recorded image; and
    e) determining the 3D coordinates of the at least one predetermined point from the recorded image under consideration of the specified relation of the image recorder to the variable illumination source, in the event that a check of the recorded image yields that the at least one predetermined point in the recorded image is marked by a feature of the variable pattern.

12. An apparatus for determining 3D coordinates of at least one predetermined point of an object, comprising:
    a variable illumination source configured to project a variable pattern onto the object arranged in a measurement region;
    an image recorder, arranged in a specified relation to the variable illumination source, and configured to record an image of at least one partial region of the object illuminated by the variable illumination source;
    a detector configured to detect the at least one predetermined point in the recorded image;
    a coordinate determiner configured to determine the 3D coordinates of the at least one predetermined point from the recorded image under consideration of the specified relation of the image recorder to the variable illumination source, in the event that a check of the recorded image yields that the at least one predetermined point in the recorded image is marked by a feature of the variable pattern; and
    a pattern varier configured to vary the variable pattern projected by the variable illumination source onto the object in the event that the check of the recorded image yields that the at least one predetermined point in the recorded image is not marked by a feature of the variable pattern.

13. The apparatus according to claim 12, further comprising:
 a parameter determiner configured to determine optical parameters of a user from the determined 3D coordinates insofar as the head of a user with spectacles frame arranged thereon in the usage position is used as the object.

\* \* \* \* \*